Feb. 8, 1966          L. H. SMITH          3,233,345
                   EDUCATIONAL DEVICES
Filed July 1, 1964                    2 Sheets-Sheet 1
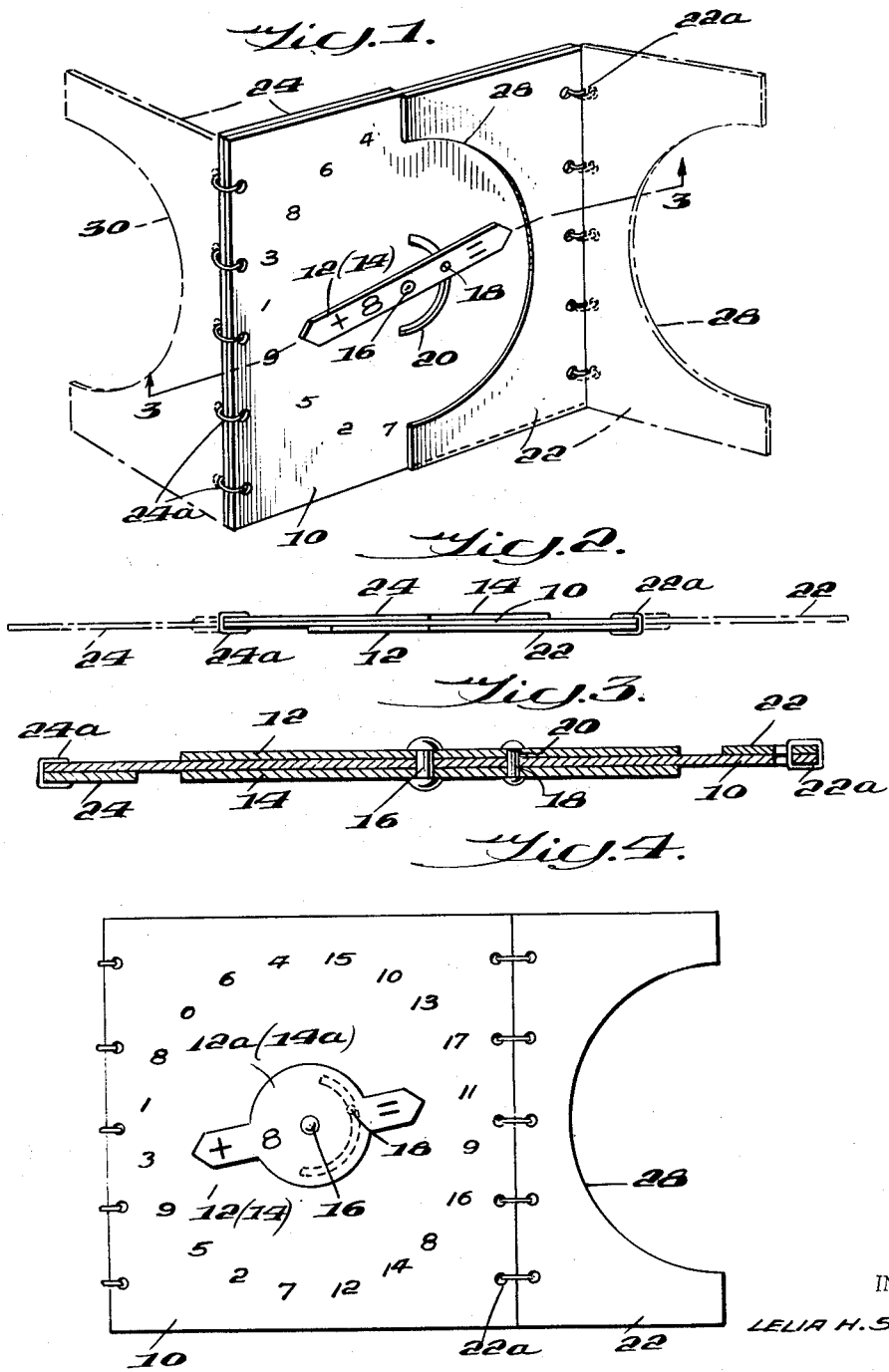
INVENTOR
LELIA H. SMITH,
BY *Harold Kilcoyne*
ATTORNEY Feb. 8, 1966   L. H. SMITH   3,233,345
EDUCATIONAL DEVICES
Filed July 1, 1964   2 Sheets-Sheet 2
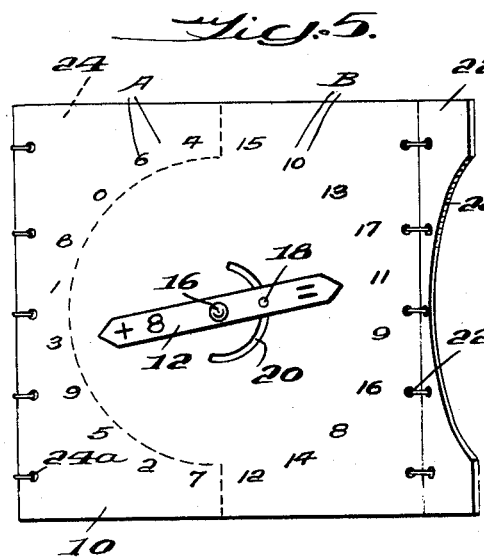
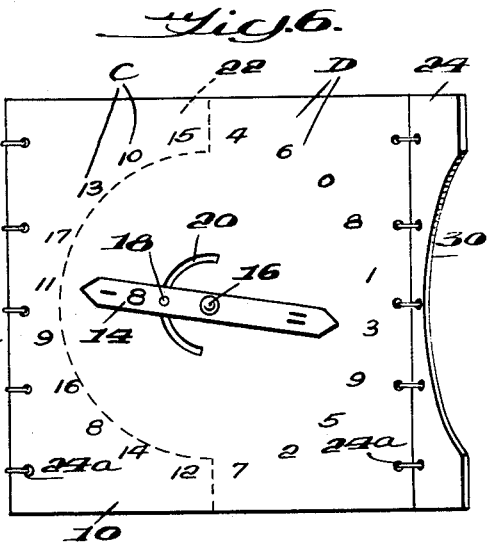
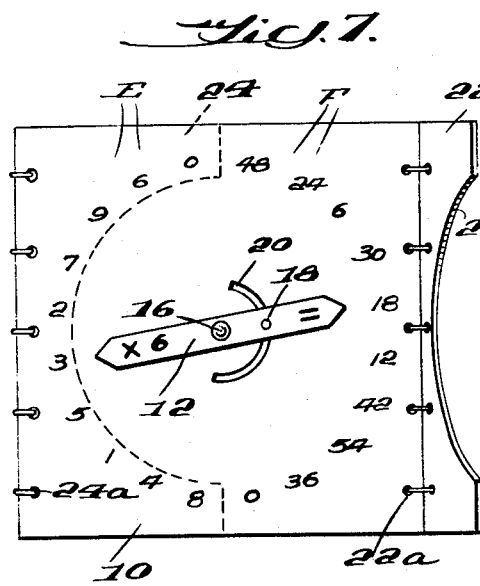
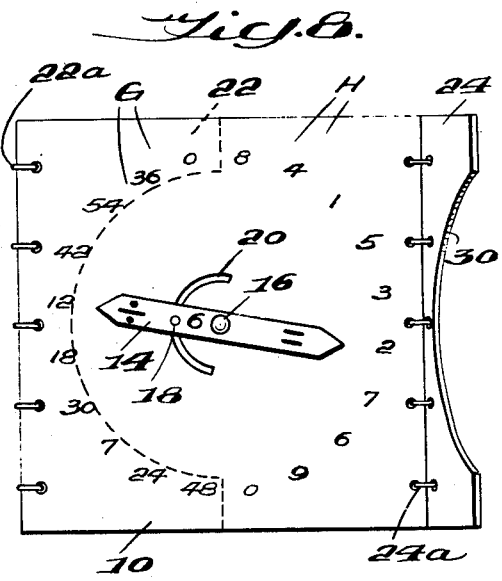
INVENTOR
LELIA H. SMITH,
BY 
ATTORNEY United States Patent Office 3,233,345
Patented Feb. 8, 1966

3,233,345
EDUCATIONAL DEVICES
Lelia H. Smith, 1529 W. Lane St., Lakeland, Fla.
Filed July 1, 1964, Ser. No. 379,679
6 Claims. (Cl. 35—31)

This invention relates to improvements in educational devices and is more particularly addressed to an improved basic mathematics teaching and learning aid. The present application for Letters Patent for such a device is a continuation-in-part of my application Serial No. 208,175, filed June 21, 1962 (now abandoned).

Among the objects of the present invention may be noted the provision of an improved, simplified device designed to aid children and others in learning the basic addition, subtraction, multiplication and division combinations of arithmetic; the provision of such a device which further provides an effective aid to the learning and understanding of the inversely related operations on numbers, i.e. subtraction as the inverse of addition, division as the inverse of multiplication, and vice versa, not as separate and unrelated operations but, instead, as sets of very definitely related operations; the provision of an improved dial-type mathematics learning aid characterized by its ability to spell out a plurality of different mathematical sentences for solution and ultimate verification by the user thereof; the provision of an improved dial-type mathematics learning aid characterized by dials, indicators and information on or associated with the opposite faces of a card- or plate-form body member, and which is so constructed and arranged as to be capable, upon corresponding rotary movement of the indicators with respect to the dials, of spelling out inversely related mathematical sentences on said opposite faces; the provision of a dial-type mathematics learning aid as aforesaid employing a novel arrangement and mounting of cover plates serving normally to mask the answer portion of said mathematical sentences but which can be raised to an answer-exposing position enabling the learner or user to verify his answers for said sentences; and the provision of an effective basic mathematics learning aid as aforesaid of simple construction and of a design lending itself to inexpensive manufacture, and which is thoroughly dependable in its operation.

The above and other objects and features of advantage of a basic mathematics learning aid according to the invention will appear from the following detailed description, in which reference is had to the accompanying drawings illustrating preferred physical embodiments thereof, wherein FIG. 1 is a perspective view generally illustrating the constructional details and partial cover arrangement of a mathematics learning aid or device according to the invention, the covers being shown in full lines in their normal answer-masking position, and in broken lines in their answer-exposing position;

FIG. 2 is an edge view looking onto said device from the lower edge thereof;

FIG. 3 is an enlarged section taken on line 3—3 of FIG. 1, which is intended to illustrate that the rotatable indicators associated with the opposite faces of the devices are mounted to turn in unison;

FIG. 4 is a detail view illustrating a slightly modified form of indicator characterized by a radially enlarged hub portion designed to cover its pivoting and motion-limiting means;

FIG. 5 is a plan view of a mathematics learning aid or device as herein proposed designed for use in teaching addition and FIG. 6 is a similar view showing the reverse side of the device adapted to teach subtraction, said figures taken together further showing the use of the device to teach the inverse relationship of addition and subtraction, both said views showing the partial or answer covers in their raised or answer-exposing positions; and FIGS. 7 and 8 are views similar to FIGS. 5 and 6 set up to teach not only multiplication and division as such but also the inverse relationship of one such operation to the other.

Referring to the drawings in greater detail, a mathematics learning aid or device as herein contemplated, in its structural aspects, comprises: a preferably square card or plate 10 of rigid material, such as stiff cardboard, which constitutes the body member of the device; a pair of indicators 12, 14, one disposed on one face and the other on the opposite face of said plate and being connected to one another for rotary movement in unison about the center of said plate both by a common pivot 16 extending through the middle-length points of said indicator and the center of the plate and by an indicator-connecting rivet or pin 18 spaced radially outwardly from said center and which passes through an arcuate slot 20 provided in the plate; and partial covers 22, 24 (to be hereinafter referred to as "answer covers") hingedly secured to the opposite side edges of said plate 10 for raising and lowering motion with respect thereto by hinge means generally designated 22a, 24a. Preferably, said hinge means 22a is of a type as to bias the partial cover 22 with which it is associated towards one face of the plate, and said hinge means 24a is similarly of a type as to bias the partial cover plate 24 against the opposite face of said plate. A simple hinge means providing the requisite bias on each said cover plate as aforesaid is shown to comprise a plurality of endless rubber bands which are threaded through aligned holes in the edge of each partial cover plate and the edge of the body plate to which the latter connects, said rubber bands being sufficiently small that they always snug the cover plates against the body plate as shown in FIG. 3. It will of course be understood that any other hinge means having cover plate to body plate biasing function may be substituted for said endless rubber bands.

According to the invention, each face of the plate 10 is imprinted or otherwise provided with two sets of diametrically opposed numbers arranged in connecting right- and left-hand semi-circles of like radius struck from the center of the plate 10, the numbers of each set being spaced equally apart and the diametrically opposed numbers of the two sets being disposed on diameters of the full circle defined by said two semi-cylindrical sets of numbers. Preferably, the indicators 12 and 14 have slightly less length than the diameter of said circle and are provided with pointed ends, thus to facilitate the setting of the indicators and the reading of the diametrically opposed numbers of the semi-circular sets thereof to which the opposite ends of the indicators point. Thus, each face of the plate 10 resembles a circular dial and each rotary indicator (12 or 14) associated therewith generally resembles a diameter-like hand or pointer turning about the center of said dial.

Preferably, the aforesaid arcuate slot 20 in which the non-centrally disposed indicator-connecting pin 18 operates extends along a vertical arc of approximately 180°. Accordingly, the action of said pin and its slot 20 is to limit the rotary motion of the indicators to a range such that the mathematical operations capable of being performed by the device are always accurate and meaningful, as will be hereinafter more fully explained. The slot 20 may be left exposed as in FIG. 1, or it may be masked through the provision of cover sheets on the outer faces of the large diameter hub portions 12a, 14a provided on the indicators 12, 14, as shown in FIG. 4.

The aforesaid partial covers 22, 24 are provided in their free edges with semi-circular cut-outs 28, 30, respectively, of radius such as to permit motion of the indicators 12, 14 within their respective ranges without interference from said covers, while at the same time leaving the covers each with a circular edge portion configured and located so as to mask the right-hand semi-circular set of numbers on each face of the plate when said covers are in their respective lowered positions.

According to a further feature of the invention, the indicator 12, 14 each has impressed or otherwise provided thereon an operational symbol and a number, which are such that when they are combined with any two diametrically opposed numbers of the semi-circular sets thereof, there is spelled out a complete mathematical sentence. Thus, it is possible for as many mathematical sentences to be spelled out on each face of the device as there are related numbers in the opposed semi-circular sets thereof.

The manner of applying a device having the structural features as just described as an aid to learning the basic addition, subtraction, multiplication and division combinations of numbers, as well as to a proper understanding of the inversely related operations involved in the addition and subtraction, and in the multiplication and division of numbers, will now be explained. Referring first to FIGS. 5 and 6, which show the device set up for both simple addition and subtraction problems on each of its opposite faces and also in manner as to illustrate the inverse relationships involved in the operations of addition and subtraction of numbers, it will be noted that the face of the card or plate 10 shown in FIG. 5 has imprinted thereon a left-hand semi-circle A made up of the whole numbers 0 through 9 arranged at random; that the operational symbol appearing on the indicator 12 associated with said face is "+8=," such being the addition or plus sign, the number 8 which it will be understood is typical of any of the whole numbers 0–9, etc. which is to be added to the numbers of the semi-circle A, and the equation sign; and a right-hand semi-circle B of numbers, being those which correctly complete the mathematical sentences represented respectively by the number of the left-hand semi-circle to which the left end of the indicator 12 may point, plus the number 8 appearing on said indicator. For example, if the numbers of the left-hand circle are (reading downwardly) the randomly related numbers, 4, 6, 0, 8, 1, 3, 9, 5, 2 and 7, the numbers making up the right-hand semi-circle thereof (reading upwardly) will be 12, 14, 8, 16, 9, 11, 17, 13, 10 and 15, since these latter numbers are the answer portions (sums) of the mathematical sentences 4+8=12, 6+8=14, 0+8=8, etc. capable of being spelled out by the device as the indicator is turned throughout the range of its permissible 180° turning motion in counterclockwise direction.

However, it will be understood that these answer portions are normally masked by the partial cover 22 which thus serves as an "answer cover" but which is capable of being very simply raised to expose said answer. Accordingly, the user of the device has at hand the means to test his ability to correctly complete the sentence and thereupon to verify his answer or solution simply by lifting said cover, thus to expose the number toward which the pointed right end of the indicator 12 is then pointing.

To adapt the device as just described for use not only as an aid to the learning of simple problems of subtraction as well as addition but also to a proper understanding of the inverse relationship that subtraction bears to addition, and vice versa, the opposite or so-called subtraction face of the plate or card 10 is imprinted or otherwise provided with the identical semi-circular sets of numbers as the first described or addition face, but as will be seen from FIG. 6, the sets of numbers (designated C and D) are transposed from right to left and from left to right. That is to say, on said subtraction face, the 4, 6, 0, 8, 1, 3, 9, 5, 2 and 7 series of numbers are placed so as to make up the right side semi-circle, whereas the 12, 14, 8, 16, 9, 11, 17, 13, 10 and 15 (reading upwardly) are placed so as to make up the left-hand semi-circle. Although the indicator 14, as was the indicator 12, is imprinted or otherwise provided with the number 8, the operational symbol for subtraction is of course the negative (−) rather than the positive (+) sign. Thus, with clockwise movement of the indicator 14 up the left-hand semi-circular set of numbers, the device is adapted to spell out the mathematical sentences 12−8=4, 14−8=6, 8−8=0, etc., the learning of which aids the user in acquiring a knowledge of the basic principles of subtraction, the answer cover 24 further assisting in this respect as it enables the user to test out his so acquired knowledge.

But at least equally importantly, the device enables the user to acquire the further understanding of the inverse relationship of subtraction to addition, and vice versa, merely by "flipping" the device 180° about a vertical axis extending through same. In explanation of this important function of the device, the transposition of the numbers making up the semicircular sets thereof on the opposite faces of the device, taken with the fact that the indicators move in unison, provide that a mathematical sentence of addition and an inversely related sentence of subtraction are invariably disposed back-to-back. That is to say, if the addition face is up and the indicator 12 spells out the mathematical sentence, 4+8=12, for example, the inversely related sentence of subtraction, 12−8=4, is spelled out by the indicator 14 on the opposite face of the device. Since this same back-to-back disposition obtains for all mathematical sentences of addition and subtraction capable of being spelled out by the device, the user thereof can establish the inverse relation of one sentence to its inversely related sentence simply by flipping the device over from right-to-left or from left-to-right, as the case may be.

Referring now to FIGS. 7 and 8, such illustrate a mathematical learning aid according to the invention set up to teach both simple problems of multiplication and division, and an understanding as well of the inverse relation that multiplication and division bear to one another. More particularly, FIG. 7 shows a device structurally similar in all respects to that previously described in connection with FIGS. 1–3, for example, and which differs from the device described in connection with FIGS. 5 and 6 only in that mathematical sentences of multiplication and division are substituted for those of addition and subtraction characterizing said lower numbered views. Thus, in FIG. 7 the face of the plate termed the multiplication face has a left-hand semi-circle E of the whole numbers 0–9, inclusive, shown as arranged in the random order of 0, 6, 9, 7, 2, 3, 5, 1, 4 and 8; the indicator 12 bears the operational symbol "×6=" indicating respectively the operation of multiplication and that the number 6 has been selected as the multiplier; and a right-hand semi-circle F of "answer" or product numbers, which are of course the numbers which complete the respective mathematical sentences of multiplication, for example, $$9\times 6=54,\ 5\times 6=30$$

capable of being spelled out by the device with movement of the indicator to positions in which its left end points to a number of the left-hand semi-circle. Thus, the numbers of the right-hand semi-circle are, reading downwardly, 48, 24, 6, 30, 18, 12, 42, 54, 36 and 0, which are of course the respective (normally covered) products of the sentences of multiplication capable of being spelled out by the illustrated device.

The so-called division face, shown in FIG. 8, bears the identical numbers appearing on the multiplication face, but such are arranged as sentences of division and also to show the inverse relation that division bears to multiplication, by arranging the inversely related sentences in back-to-back relation with respect to one another. Thus, as seen in FIG. 8, the product numbers of FIG. 7 are here the dividend numbers, being arranged in the left-hand semi-circle G; the multiplicand numbers of FIG. 7 are here the quotient numbers, being arranged in the normally right-hand semi-circle H; and of course the operational symbol is the division (÷) rather than the multiplication sign as in FIG. 7.

Thus, in addition to establishing by proper use of the device that 54÷6=9, 30÷6=5, and so on, a child or other user can also learn the inverse relationship of such sentences of division to the above set forth sentences of multiplication, i.e. 9×6=54, 5×6=30 (and vice versa) simply by flipping the device about a vertical axis to bring one or the other face of the device to view. As above explained, such follows from the back-to-back disposition of the inversely related sentences of multiplication and division capable of being spelled out by the device.

While the hinge means 22a, 24a normally serve to bias the partial covers 22, 24 to positions in which they cover the answer portions of the mathematical sentences capable of being spelled out by the subject learning aid on only one face thereof, preferably said hinge means are each of a type such that they are also capable of biasing the partial covers to positions in which they overlie the opposite dial face, thus to cover the identical semi-circular set of numerals appearing on said opposite dial face. Such a two-face cover positioning means thus provides, when applied to the addition and subtraction learning aid shown in FIGS. 5 and 6, not only for the study and learning of mathematical sentences such as 4+8=12, 6+8=14, 0+8=8, etc. or 12—8=4, 14—8=6, 8—8=0, etc. as previously explained, but also, by swinging the partial covers 22, 24 to positions in which they lie against the opposite dial face, for the study and solution of the opposed incomplete sentences of addition and subtraction, namely, ?+8=12, ?+8=14, ?+8=8, etc. or ?—8=4, ?—8=6, ?—8=0, etc.

Similarly, the device shown in FIGS. 7 and 8, assuming the partial-cover hinge means 22a, 24a permit the cover plates to swing against the respective opposite faces of the device, will, in addition to spelling out sentences of multiplication and addition as above, also be capable of presenting for study the opposed, incomplete sentences of multiplication and division, such as ?×6=54, ?×6=30, etc. or ?÷6=9, ?÷6=2; ?÷6=5, and so on.

It will of course be understood that while for purpose of simple disclosure mathematical sentences of addition, subtraction, multiplication and division built upon the one-digit numbers 0–9 inclusive, and similarly that the one-digit numbers 8 and 6 have been used in association with the operational symbols placed on the indicators 12 and 14, plural-digit and fraction numbers can be used instead, and of course will be used in accordance with the progress made by the child or user of the device in his study of basic mathematics through the use of the device.

As many changes could be made in carrying out the above constructions without departing from the scope of the invention, it is intended that all matter contained in the above description or shown in the accompanying drawings shall be interpreted as illustrative and not in a limiting sense.

I claim:

1. A mathematics learning aid comprising: a plate-form base member, two sets of numbers impressed on a face of said base member, said sets extending along connected right- and left-hand semi-circles and the numbers making up each set being circumferentially spaced from one another and diametrically opposed to numbers of the other set, an indicator pivotally connected to said base member for turning movement about an axis extending therethrough on the center of the circle defined by said two sets of numbers, said indicator having length which is slightly less than the diameter of said circle and terminating in points thereby serving to visually couple the diametrically opposed numbers of the sets thereof with which the indicator is aligned at any one time, stop means carried by said base member for limiting motion of the indicator in either direction past the vertical diameter line of the circle, said indicator having operational symbols and a number impressed thereon which are readable left to right along the length thereof, the aforesaid numbers and operational symbols bearing a mathematical relation such that when the indicator is turned to any one number of the left-hand semi-circular set thereof said number in concert with the operational symbols, the number on the indicator and the diametrically opposed number of the right-hand set thereof spell out a complete mathematical sentence, and a partial cover hingedly connected by hinge means to a side edge of said base member adjacent one semi-circular set of numbers and having a free edge portion which is configured so as to mask all numbers of said one set from view while permitting turning movement of the indicator throughout its permissible range of movement, said hinge means biasing said partial cover to a position in which it lies substantially flat against said base member and thereby masks said one set of numbers from view, but permitting movement of said partial cover to a raised position in which it exposes said one set of numbers and thereby renders fully visible any one complete mathematical sentence spelled out by the device as aforesaid.

2. A mathematics learning aid according to claim 1, wherein said one semi-circular set of mathematical numbers represent the solution portions of the mathematical sentence capable of being spelled out by the device, and wherein said partial cover is hingedly connected by hinge means to a side edge of the base member adjacent to said one set of numbers, thereby normally masking the solution portions of said mathematical sentences from view.

3. A mathematics learning aid comprising: a plate-form base member; each of the opposite faces thereof having impressed thereon two sets of numbers extending along connected right- and left-hand semi-circles which together define a circle and the numbers making up each semi-circular set being circumferentially spaced from one another and diametrically opposed to the numbers of the other semi-circular set; the circles defined by the semi-circular sets of numbers having the same radius and being struck from a common center and the numbers of the semi-circular sets thereof on said opposite faces being arranged back-to-back with respect to one another; a pair of indicators, one on each of said opposite faces, pivotally connected to the base member for turning movement about said center and being connected to one another in back-to-back relation and for movement in unison, said indicators having the same length which is slightly less than the diameter of said circles defined by each two semi-circular sets of numbers and terminating in points whereby each said indicator is adapted to visually couple the diametrically opposed numbers of said connected semi-circular sets thereof; stop means carried by said base member for limiting motion of said connected indicators in either direction past the vertical diameter of said circles; each said indicator having operational symbols and a number impressed thereon which are readable left-to-right along the length thereof; the aforesaid diametrically opposed numbers of the connected semi-circular sets thereof on each face and the symbols and the number impressed on the indicator for said face bearing a mathematical relation such that when the said indicator is turned to a position visually coupling any two of said diametrically opposed numbers, said indicator in concert with said coupled numbers will spell out a complete mathematical sentence; said numbers and symbols being such that the indicators together spell out sentences on said opposite faces which are inversely related mathematically.

4. A mathematics learning aid according to claim 3, wherein the numbers of one semi-circular set thereof impressed on each of the opposite faces of the device represent the respective solutions of the mathematical sentences capable of being spelled out on said face as aforesaid, and wherein partial covers are hingedly connected by hinge means to the opposite side edges of the device, one said partial cover being adapted normally to mask the solutions of the mathematical sentences capable of being spelled out on the one face and the other said partial cover being adapted normally to mask the solutions of the mathematical sentences capable of being spelled out on the other face of the device.

5. A mathematics learning aid according to claim 4, wherein said hinge means are constructed and arranged as normally to bias the partial covers to lowered positions against said opposite faces of the device in which they mask said solutions, while permitting raising of said covers to solution-exposing positions.

6. A mathematics learning aid according to claim 5, wherein said hinge means are also constructed and arranged as to permit each said partial cover plate which is connected thereby to an edge of the device to swing approximately 360° to a position against said other face of the device in which it covers the numerals of the sentences opposite the answers thereof while leaving the answers exposed.

References Cited by the Examiner
UNITED STATES PATENTS

| | | | |
|---|---|---|---|
| 416,639 | 12/1889 | Mullins | 281—36 |
| 1,161,381 | 11/1915 | Duffy. | |
| 2,234,075 | 3/1941 | Carolin | 35—35.5 X |
| 2,693,362 | 11/1954 | Ford | 35—73 X |
| 3,027,073 | 3/1962 | Handelman | 235—83 |

FOREIGN PATENTS

| | | | |
|---|---|---|---|
| 165,225 | 6/1921 | Great Britain. | |

EUGENE R. CAPOZIO, *Primary Examiner.*

LAWRENCE CHARLES, *Examiner.*